United States Patent [19]

Menasian

[11] Patent Number: 4,557,738

[45] Date of Patent: Dec. 10, 1985

[54] VACUUM COLLECTOR

[76] Inventor: David R. Menasian, 12140 Powerhouse Rd., Potter Valley, Calif. 95469

[21] Appl. No.: 382,447

[22] Filed: May 26, 1982

[51] Int. Cl.[4] ............................................. B01D 46/00
[52] U.S. Cl. ...................................... 55/288; 55/300; 55/502
[58] Field of Search ................................. 55/285-287, 55/283, 304, 300, 502

[56]  References Cited

U.S. PATENT DOCUMENTS

| 251,121 | 12/1881 | Kirk | 55/285 |
|---|---|---|---|
| 704,724 | 7/1902 | Whitney | 55/286 |
| 1,109,997 | 9/1914 | Lob | 55/287 |
| 2,318,395 | 5/1943 | Hornbrook | 55/287 |
| 3,898,414 | 8/1975 | Hawley | 55/283 |
| 4,199,334 | 4/1980 | Berkhoel | 55/304 |
| 4,246,011 | 1/1981 | Oberdorfer | 55/283 |

FOREIGN PATENT DOCUMENTS

232869  9/1944  Switzerland ........................ 55/300

*Primary Examiner*—Bernard Nozick
*Attorney, Agent, or Firm*—John L. Hummer

[57]  ABSTRACT

A unique hybrid shop-style and continuous-duty vacuum collector of reasonable size offers the advantages and capabilities of both specialized types, by substantially multiplying the conventional shop vacuum effective filter surface area, while preserving machine portability. The preferred embodiment employs three cylindrical pleated-paper filters to collect a wide range of sizes and weights of mixed dust and particulate debris. It is intended for both the hobbyist and the commercial shop operator who desire extended runs between filter cleanings. The filter cleaning mechanism efficiently breaks away the filtered accumulation, but protects the filter material from damage, by the carefully oriented application of mechanical shocks to generate cleaning oscillations of the filter surfaces only in their own planes. A mechanical sail interlock prevents additional filter damage by precluding accidental activation of the filter cleaning mechanism during the dirt collection process. The arrangement has special purpose applicability as a reliable filtering component in various gaseous systems, including those of low-gravity space.

18 Claims, 9 Drawing Figures

VACUUM COLLECTOR

BACKGROUND OF THE INVENTION

1. Field of the Invention

This versatile invention relates generally to the vacuum collector arts and particularly applies to both continuous-duty dust collectors and high-suction shop vacuums to create a unique hybrid machine with the advantages and capabilities of both types, while incorporating improvements that make the combination possible and practical.

2. Prior Art

A vacuum collector operates by means of a motor-driven blower generating a suction.

Continuous-duty cloth-filter dust collectors conventionally employ low suction, typically 1.5 to 6 inches of water vacuum, and are useful only for fine dusts and light particles, such as those generated by powered machinery. Their bulky stationary collector cabinets can be connected by fixed ductwork to specific dust-producing machines. Air volumes may be 300 cubic feet per minute and up. The very large filter surface area required, so as to have little restriction of air flow during exceptionally long runs between filter cleanings, has been usually obtained by mounting folded cloth on some framework that is incompatible with the portability and small size demanded of a shop vacuum. Since such cloth filter arrangements are not suitable to operationally withstand high suction, there is functional incompatibility as well.

Thus continuous-duty dust collectors cannot double as shop vacuums for both size and functional reasons.

Shop vacuums require strong suction, typically 20 to 100 inches of water vacuum, which enables general cleanup of heavy particles. Air volumes of 70 to 150 cubic feet per minute may be conducted through flexible hose from various hand-held pick-up tools. The larger particle size allows a smaller filter surface area, compatible with portability, to suffice for relatively long runs between filter cleanings or changes. Of course the high suction is fully able to pick up various dusts. But fine dust quickly clogs the typical limited size cloth or throw-away paper bag filter, and the conventional shop vacuum must be taken apart for filter cleaning or replacement when the suction effectiveness is intolerably reduced. Sometimes another vacuum cleaner is used to try to lift the fine dust that has become tightly wedged into the interstices of a non-replaceable cloth filter bag. The high frequency that these annoying operations must be done when great quantities of fine dusts are being collected during long power tool runs makes the conventional shop vacuum be incompatible with efficient continuous-duty dust collection. The operator may get dirty or inhale harmful dusts in this filter replacement or cleaning process.

Thus it is impractical for a conventional shop vacuum to double as a continuous-duty dust collector.

SUMMARY OF THE INVENTION

This invention provides an improved, fully portable and convenient, shop-style and continuous-duty vacuum collector, whose simple and reliable basic design satisfies the objectives of a hybrid machine having the advantages and capabilities of both specialized types. Thus the hobbyist, as well as the commercial shop operator, can obtain, at a reasonable price, the salient features of both types in a single vacuum.

Flexible hose from the vacuum can be readily connected to either hand-held pick-up tools or to piping running from dust and chip pick-up fixtures permanently mounted on saws, drills, lathes, milling machines, planers, sanders, grinders, polishers, and many other types of dust-generating machinery, including weaving and natural and synthetic fiber processing. Air volumes of 70 to 150 cubic feet per minute, which are typical of shop vacuums, are indeed adequate for continuous-duty dust collection if, first, the dust pickups are efficiently designed to minimize air flow requirements; second, an adequately limited number of machines (perhaps only one in some circumstances) are generating dust; and third, a satisfactory solution is presented to the bag-clogging problem.

The inventor has discovered that, because of the unique design and by means of: (1) tripling the "conventional" shop vacuum filter surface area by the use of one or more cylindrical filters (three in the preferred embodiment), and (2) the use of pleated-paper in the filters which also multiplies the effective filtering area by several times that of a plain cylinder, the time to clog the filters increases by a factor of 20 or more compared to a conventional shop vacuum.

The exact total multiplying factor of the filter area depends upon the design and depth of the pleated serrations, but it can be as high as 10 or so. The pleats also provide structural support to withstand the high suction. They can be backed up with a cylindrical wire mesh on the inside if further structural reinforcement is desired. One cannot push the surface area beyond a reasonable limit by means of pleating. It is important that the pleats not be too close as it is self-defeating in this application for the spacing to be closer than ½ to ¾ inch, since the pleats then tend to plug up.

These improvements are sufficient to enable continuous-duty dust collection by a portable shop-style machine.

In addition, a quick and uniquely effective filter-cleaning mechanism which relies on a shock action applied very carefully in a way that will be described, to the pleated-paper surfaces, completely avoids damage to the filter paper during cleaning. Yet it efficiently breaks away the filtered material, allowing it to fall into a totally closed container where it accumulates, and thereby protects the operator and the environment from exposure to harmful dusts during filter cleaning.

Furthermore, a reliable mechanical sail switch interlock positively prevents the operator from cleaning the filters during vacuum collector operation. Such abuse, which would tend to wedge collected dust deeper and permanently into the paper pores and materially shorten filter life, cannot happen.

THE PREFERRED EMBODIMENT

Figure 1:
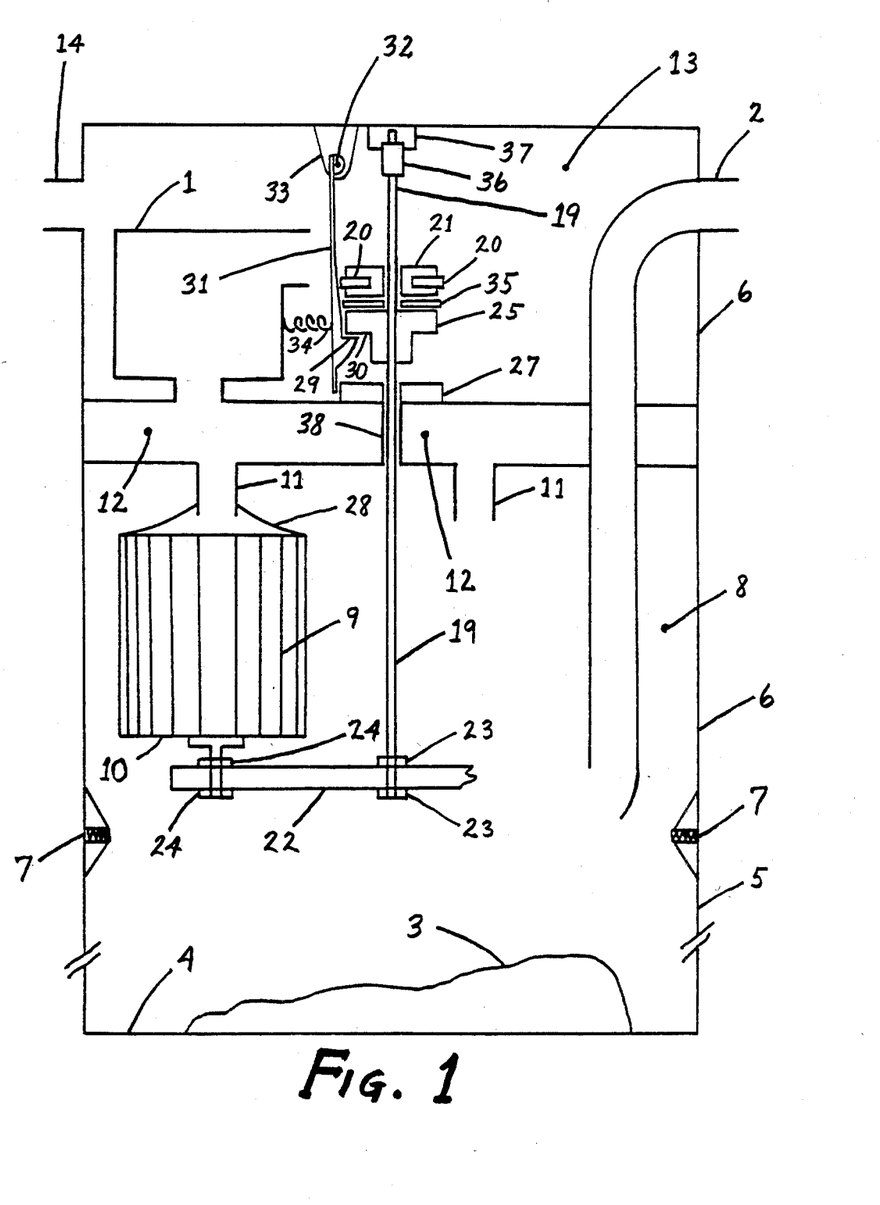
FIG. 1 illustrates the preferred embodiment of the present invention as seen somewhat schematically from the side featuring an edge view of the mechanical sail 31, which is hinged in the output air stream of blower 1 to disable filter cleaning when suction is present.
Figure 2:
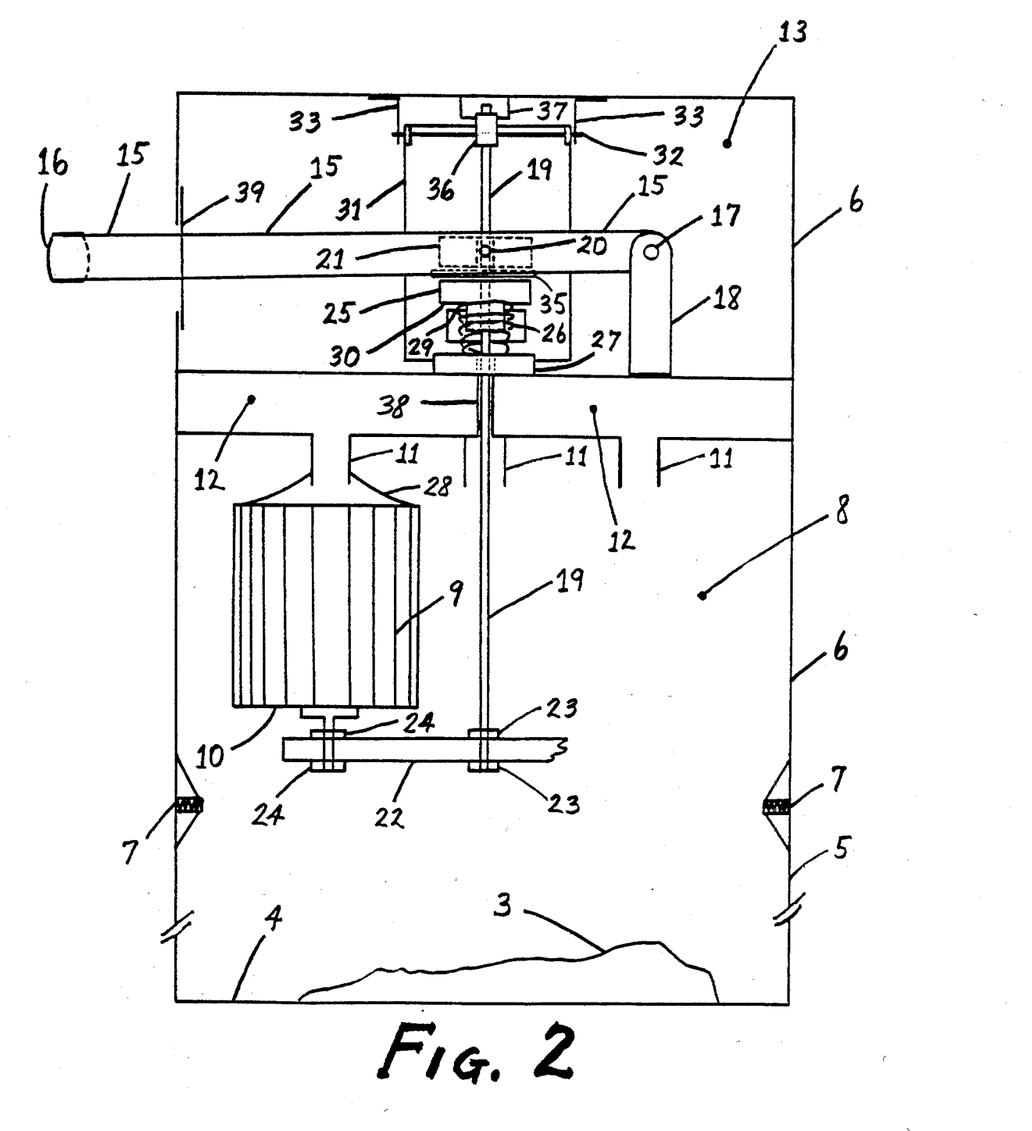
FIG. 2 presents a side view taken transversely to that of FIG. 1 which features the manual filter cleaning simple lever 15.
Figure 3:
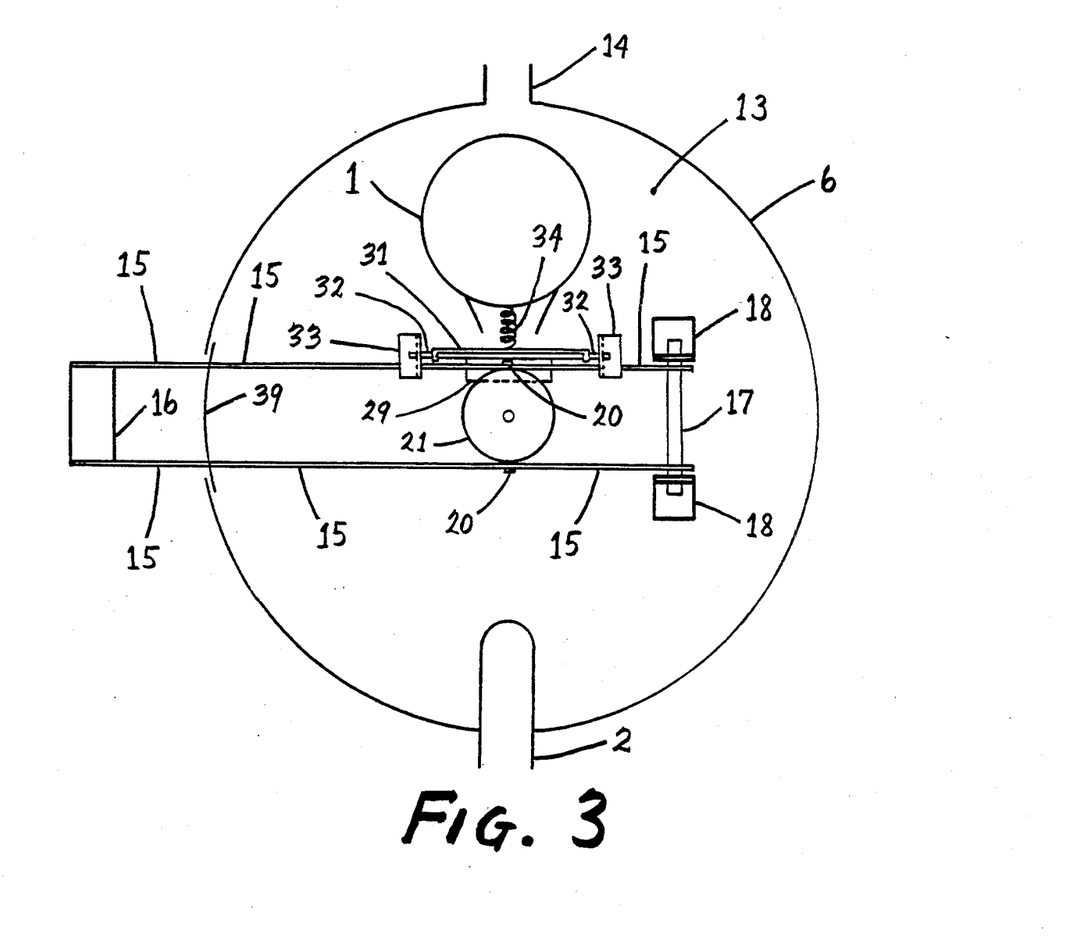
FIG. 3 is a similarly schematic top view of the upper interior of the housing of the preferred embodiment.
Figure 4:
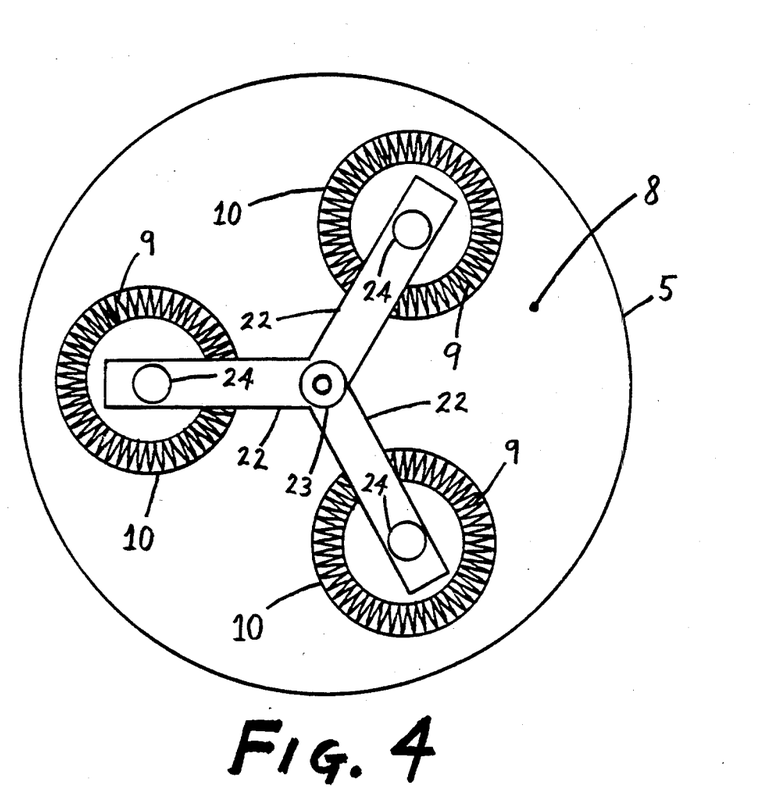
FIG. 4 is a bottom view of the lower interior of the housing of the preferred embodiment which features the unitary assembly of three filters 9.

FIGS. 1, 2, 3 and 4 should be examined together to gain an understanding of the invention as depicted in the preferred embodiment. FIGS. 1 and 2 are side views perpendicular to each other. FIG. 3 is a view looking down on some of the upper portion of FIG. 2, while FIG. 4 is a view looking upwards to show some of the lower portion of FIG. 1. The drawings are intended to be more or less schematic. Some parts are shown exaggerated in size and not all parts appear in every drawing. Where rendering a particular sub-assembly would block the understanding of another, it has been eliminated. Clearances are often shown exaggerated to show the part separations. It is understood throughout this disclosure that there are equivalent elements to the parts shown, as well as equivalent means of attaching the parts to each other.

GENERAL OPERATION OF THE PREFERRED EMBODIMENT

In response to the strong vacuum generated by the electric motor-driven two-stage high pressure centrifugal blower 1, debris and dust-laden air enter the intake tube 2.

Heavy particles fall to the pile 3 on the bottom 4 of the collector drum 5. While the drum is depicted as shortened in depth in order to save drawing space, in practice considerable depth should be allowed. This will enable a very large quantity of dust and debris to collect and fill the drum before it becomes necessary to detach the drum from the vacuum system housing 6 at the annular seal 7 and remove the accumulation.

Airborne dust which will not settle out by gravity is carried by the moving air in the sealed chamber 8 until it is stopped by the pleated-paper surfaces 9 of the three symmetrically-mounted cylindrical filters 10. For convenience, only one filter is shown in the side views. The air stream from the intake tube should be directed such that it does not strike the pleated paper surfaces directly. Clean air passes through the filter paper pores and out through three symmetrically-located tubes 11 into the clean air plenum 12. The clean air then proceeds through the blower 1 into the muffler chamber 13 and finally exits the machine through the exhaust tube 14.

BASIC PRINCIPLES OF PLEATED-PAPER FILTER CLEANING

The cleaning mechanism allows the operator to dislodge any dust and other material that has collected in the filter pleats. Externally operated, the filter cleaning process takes place completely within the sealed chamber where the dirt accumulates, only at a time when the blower is not running. The dislodged dirt then falls to the bottom of the drum without exposing the operator or the environment to harmful airborne dust.

This invention readily dislodges the dirt by means of sharp mechanical shocks appled to the filters everywhere exactly parallel to the pleated-paper surfaces in the direction of the pleats themselves. The use of pleated paper is very significant for several reasons. First, it is structurally strong due to the beam-reinforcing effect of the pleats and thus able to withstand high suction, particularly in a cylindrical shape. When suction is applied to the filter, it distorts in response to the pressure differential. The shifting of surface dirt particles, disturbed by such distortion and under the influence of suction, causes these particles to pack more tightly against and into the filter pores. The rigidity of the pleating structure helps to minimize this effect, thus reducing the tendency to plug the filter pores and consequently increasing the continuous use capability of the machine between filter cleanings. Second, the pores or air passages through the paper material may be smaller and superior to cloth, where clogged pores may be more difficult to clean. Third, the filter paper is particularly strong in the direction of the pleats with respect to tolerating applied shocks.

Taking full advantage of this third factor, this invention applies no shock whatsoever perpendicular to any of the pleated-paper surfaces during cleaning. Thus there is no scraping, beating, bending, stretching, or other deforming of the pleated paper during cleaning which would shorten its service lifetime. Since paper abrasion and flexure, which are the chief causes of failure, are eliminated, the service lifetime of the filters is thereby extended indefinitely in most applications. The need for filter element replacement becomes a rarity generally due to accidental damage, such as tearing or perforation of the paper due to mishandling. Because of the large filter area available in the present invention, reasonably limited damaged areas of the pleated paper can be simply sealed with silicone rubber caulk without affecting machine performance. Furthermore, the large filter area of the invention enables a machine the size of a portable shop vacuum to meet continuous-duty dust collector requirements.

CLEANING OPERATION OF THE PREFERRED EMBODIMENT

A dual lever 15 spanning an externally accessible cleaning handle 16 is hinged by a pin 17 to two brackets 18 mounted within the muffler chamber 13. The dual lever is also linked to a lever collar 21 by two protruding pins 20. When the cleaning handle is smartly depressed, the lever collar transmits the motion, preferably through a thrust-slip washer 35, to a stop collar 25, which is firmly attached to a vertical shaft 19. Thus the spring 26, held between the stop collar and the stop plate 27, is compressed further by the relative motion, and the spider 22, which is bolted to the shaft by nuts 23, and the three cylindrical filters 10 which are bolted to the spider by nuts 24, are all forced downward. This shaft motion continues until the stop collar impacts suddenly on the stop plate, which must be stoutly mounted on the sturdy structure of the housing. The downward excursion of the shaft abruptly ceases. Thus the resulting sharp mechanical shock is centrally generated and transmitted directly through the shaft and distributed symmetrically through the spider to the axial center of each cylindrical filter, from which the shock is further distributed symmetrically and equally to all of the filter pleats. Thus the cleaning shock impacts everywhere exactly parallel to all of the pleated-paper surfaces, of which 9 is typical, causing dirt to be dislodged downward to be added to the accumulation pile 3.

Throughout this process, flexible conical diaphragm seals 28 preserve an air-tight seal between the filters and the three tubes 11 so that unfiltered air does not enter the filtered air regions.

MECHANICAL INTERLOCK OF THE PREFERRED EMBODIMENT

If filter cleaning were attempted during normal operation of the blower, dust would tend to cling to the filters and may be driven deeper into the paper pores. A mechanical interlock in the form of a sail switch prevents this. Such is preferable to an electrical interlock, for a blower can deliver damaging suction while coasting to a stop after the power has been turned off.

When the blower fan is turning, a catch 29 is held under the shoulder 30 of the stop collar by the force of the air from the blower 1 on the sail 31, which is hinged by a pin 32 to two brackets 33 mounted within the muffler chamber. Thus operation of the external handle and vertical motion of the shaft are prevented. Only when the blower air velocity drops to a minimal value can the spring 34 retract the sail and catch and allow the filter cleaning motion.

MISCELLANEOUS FEATURES OF THE PREFERRED EMBODIMENT

The lever collar 21 should fit loosely around the shaft 19 to prevent binding due to the arc travelled by the dual lever 15. It is not good to pin the lever to a lever collar which is firmly attached to the shaft, for this would cause the shaft to wobble laterally or horizontally, which is a motion to be avoided. While the mechanism will operate crudely without it, a sturdy thrust washer 35, such as one of teflon, will more smoothly transmit the vertical force while permitting the required lateral slippage between the lever collar 21 and the stop collar 25. With the thrust-slip washer, there are two pairs of slipping surfaces of dissimilar materials, as contrasted with only one pair of identical materials if a steel lever collar slips on a steel stop collar, where lubrication could become more of a problem.

The stop collar must be secured to the shaft 19 by a reliable method, such as by welding, or by means of a number of locked overdesigned set screws riding on the shoulders of flats carefully sized and cut symmetrically around the shaft. The severe shock generated by the cleaning mechanism will loosen an inadequate attachment of the stop collar, and then the cleaning shock will not be transmitted by the shaft to the filters.

The shaft 19 is constrained in its vertical motion by a slip collar 36 mounted on a bracket 37 within the muffler chamber 13, and by a guide channel 38 that crosses the clean air plenum 12 and is sealed to prevent dirt from entering the clean air region. A sealing slip joint 39 allows lever motion while preventing air escape from the muffler chamber while the blower is running.

This inventor has found that a conical shape is best for the diaphragm seals 28. During operation, dirt accumulates between the seals and the top of the dust chamber. This conical shape, sloping downward, tends to keep the accumulating dirt loose and allow it to slide away easily during the filter cleaning process. If the diaphragm seals were flat, the cleaning motion would retain the dirt by packing it more tightly, eventually causing rupture of the seals. The fact that the cleaning mechanism operates on a down stroke aids the dirt to slide down the conical surface. A down-stroke mechanism also steepens the slope of the conical diaphragm seals, further aiding dirt removal. An up-stroke mechanism would tend to forcibly wedge dirt at the tops of the filters and rupture the seals even though they were conical. During the dirt collection process, the positions of the diaphragm seals must be steadily held to avoid dirt packing resulting from unwanted diaphragm motion.

The spring 26 must be sufficiently strong to accomplish several important functions during the suction dirt collection process and when the machine is at rest: first, maintain a steady upper equilibrium position of the diaphragm seals 28; second, keep adequate separation of the impact faces of the stop collar 25 and the stop plate 27 in order to allow a sufficiently large motion for proper cleaning shock generation; and third, accomplish these functions while bearing the whole weight of the moving parts of the cleaning apparatus, including the cleaning handle and lever, the lever and stop collars, the shaft, and the filter assembly including the spider.

EQUIVALENT ELEMENTS, ARRANGEMENTS AND ATTACHMENTS

While cylindrical filters are easy to fabricate, are intrinsically strong, and have the important advantage of presenting the pleats to the airstream in a sort of opened manner, other less desirable shapes could be used.

There are many equivalent ways to attach the filters to the spider. For example, each spider arm could carry a clamping ring which encircles the bottom of a filter. Or collars with set screws could simply replace the illustrated nuts 23 and 24.

It is recommended that the housing extend below the spider level to provide support and protective covering for the filters when the dust-accumulating enclosure, which is an open-top collector drum in the preferred embodiment for convenience, is detached at the annular seal 7 and removed for emptying.

While the clean air plenum of the preferred embodiment is not necessary, it adds some sound muffling and its upper and lower walls provide convenient two-point support for the vertical shaft. The plenum can be replaced by piping that connects the flexible diaphragm seals on the filters to the blower inlet.

While the mechanical advantage supplied by the cleaning lever is very valuable to the function, it is possible to relocate it, say by mounting on top of the machine. In fact, the whole impact-generating mechanism could be placed there. However, leaving the top surface of the machine flat and unobstructed is more useful, and much safer, as fingers are more likely to be pinched in the moving parts if they are exposed.

Although the dual lever of the preferred embodiment is not absolutely necessary, a single lever that will apply the cleaning handle motion symmetrically to the lever collar seems to be a more complicated shape and is probably more expensive to fabricate.

It will be noted that a number of alternative locations exist for the spring 26 where the end result would be the same, but none of them are believed to be so convenient or protective.

NOTE ON THE OPTIMUM NUMBER OF FILTERS

Study of the filter geometry shows that by using a plurality greater than two of separate and equal right circular cylindrical filters symmetrically placed as an assembly within a right circular cylindrical housing, a greater total filter area can be obtained than that of a larger diameter single right circular cylindrical filter that exactly circumscribes the assembly, if all of the filters have the same height. If only two filters were so circumscribed, their total area would be approximately equal to that of the single encircling filter, since it has about twice the diameter of the enclosed filters. Three filters give about 40 percent more area than either one or two. Theoretically, six filters would double the area, while the theoretical upper limit of tripling the area by further increases is impossible to obtain in practice.

To achieve the same area in a single filter as is achieved in the three filters of the preferred embodiment shown in FIG. 1, the diameter of the single filter would have to be three times that of one of the three filters, for the same height. This large filter would occupy virtually the entire diameter of the housing in FIG. 1 and there would be inadequate clearance for the dust-laden air to circulate freely between the pleated paper and the housing. So a larger housing diameter would be required to achieve the same area with a single filter, or else the filter height could be increased.

If still more area were required, four filters, which add an additional 10 to 20 percent, could be used. Because of the necessity to maintain adequate clearances to allow free air flow and unobstructed cleaning, diminishing returns will be reached as additional filters are added. The three filters of the preferred embodiment have functioned well in extended testing, and represent a substantial and useful trade-off.

Figure 5:
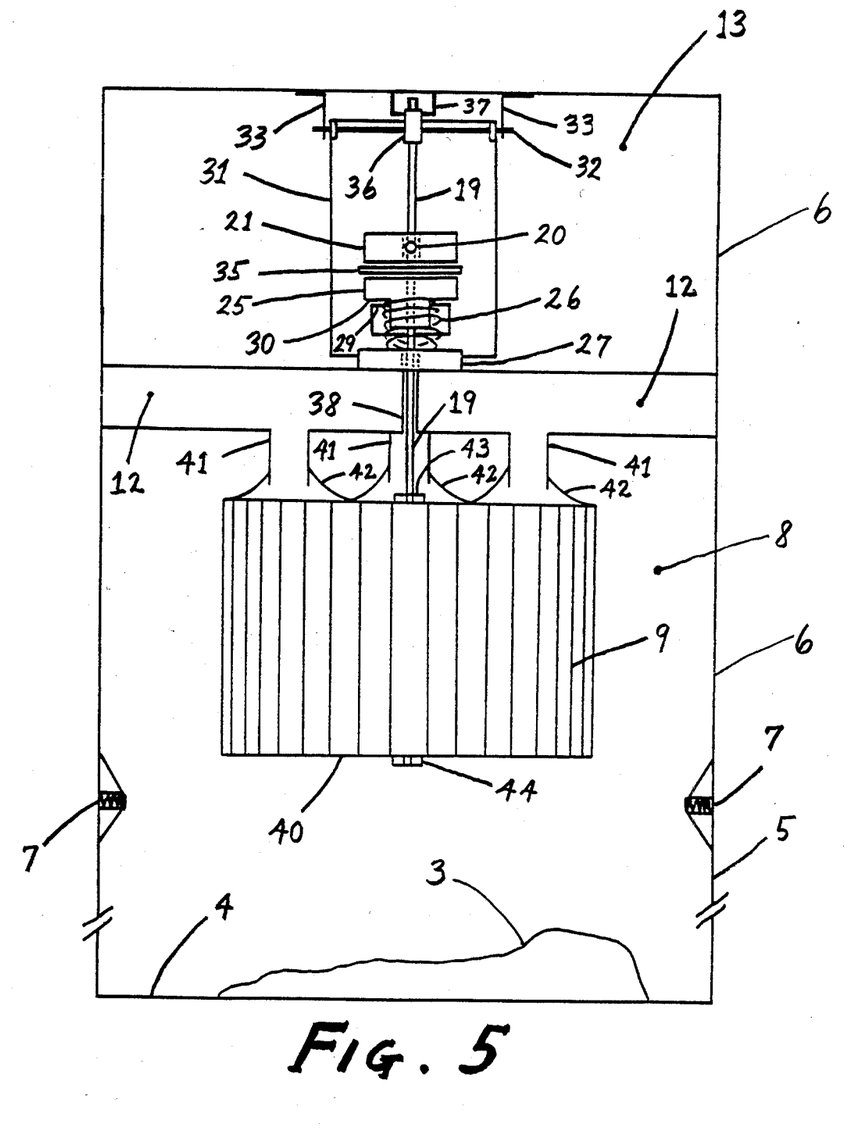
FIG. 5 depicts the present invention with a single large concentric filter 9.

FIG. 5 illustrates the use of a single cylindrical filter 40. Several pipes 41 connect the flexible diaphragms 42 to the plenum 12. There is no need for a spider. The filter may readily be held between a set collar 43 and a nut 44 on the shaft 19.

There are numerous alternative connections from a single filter to a single blower, such as a direct single pipe connection from a single flexible diaphragm, if the sound muffling provided by multiple connections through a plenum are sacrificed.

ALTERNATIVE CLEANING ACTUATORS

While the preferred embodiment dual lever cleaning actuator of FIGS. 2 and 3 has proven simplicity and effectiveness, various alternatives are possible which could be suitable under certain circumstances.

Figure 6:
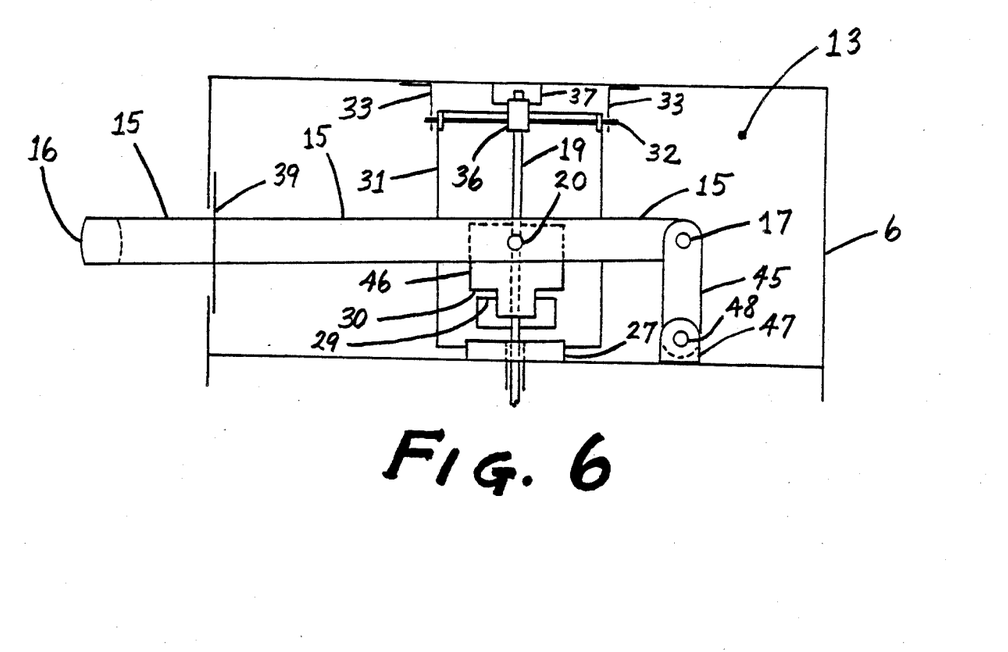
FIG. 6 schematically presents the upper structure of the present invention with an alternative manual filter cleaning compound lever 15 and 45.

FIG. 6 depicts the use of a compound dual lever segment 45, which, together with the original dual lever 15 to which it is attached by the hinge pin 17, eliminates the need for a loosely fitted lever collar. Thus a lever collar 46 can be tightly attached to the shaft 19. The lever segment is pivoted to a smaller fixed bracket 47 by a hinge pin 48. The compound lever seems more expensive than the preferred embodiment.

Figure 7:
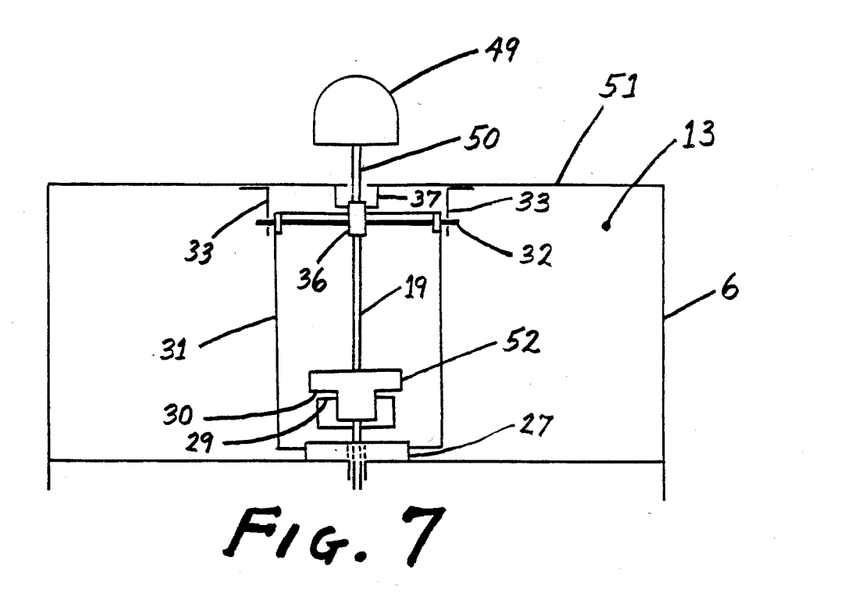
FIG. 7 shows that upper structure of the present invention with a manual filter cleaning knob.

FIG. 7 shows another alternative cleaning actuator. An externally accessible knob 49 is attached directly to the top extension 50 of the shaft 19, which penetrates the upper wall 51 of the muffler chamber 13. The remainder of the vacuum collector is identical to the previous description of FIG. 6 in that a tightly fitted shaft collar 52 is used but without a lever. When smartly depressed by the operator, the knob forces the shaft downward. The operator can place the palm of one hand on the knob, while the palm of the second hand can be placed "piggy back" on the first. It is probably necessary to repeat several rapid two-handed strokes for 15 to 30 seconds to clear the filters.

Because of the valuable advantage supplied by a lever, the preferred embodiment is superior to manual actuators which work directly upon the shaft without any mechanical advantage. The lever is consequently far less tiring to the operator, who is also not subjected to the feeling of shock to the hands and arms that naturally accompanies direct manual force on a shaft knob. However, this shock comparison with and without a lever is a convincing demonstration of the comfortable impact generating effectiveness of the preferred embodiment design.

Figure 8:
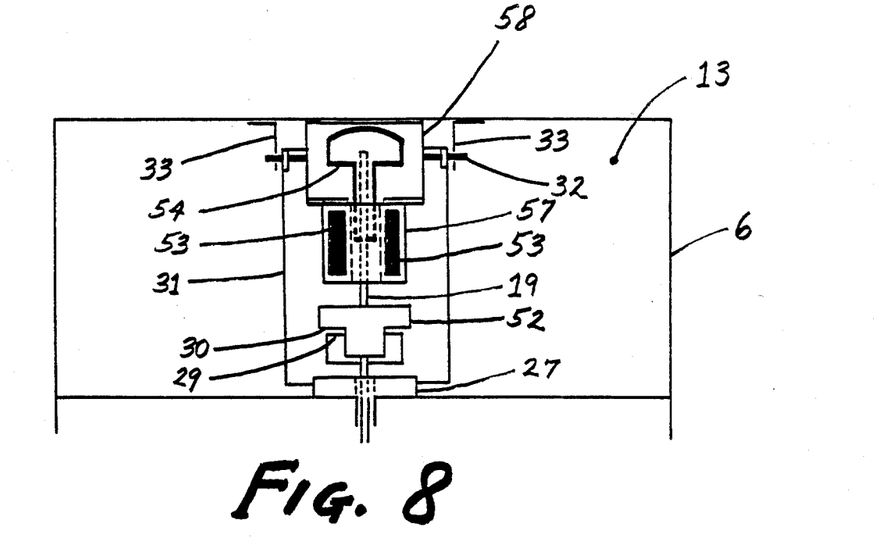
FIG. 8 depicts the present invention with an electrical solenoid filter cleaning actuator with mechanical locking features.

FIG. 8 is identical to FIG. 7 except that the external knob has been replaced by an internal solenoid actuator 57 mounted within the muffler chamber 13 by a bracket 58. Energizing the electrical coil 53 pulls the magnetic armature 54, which is firmly attached to the shaft 19. The shaft collar and sail switch mechanical interlock are the same as those of FIG. 7.

Figure 9:
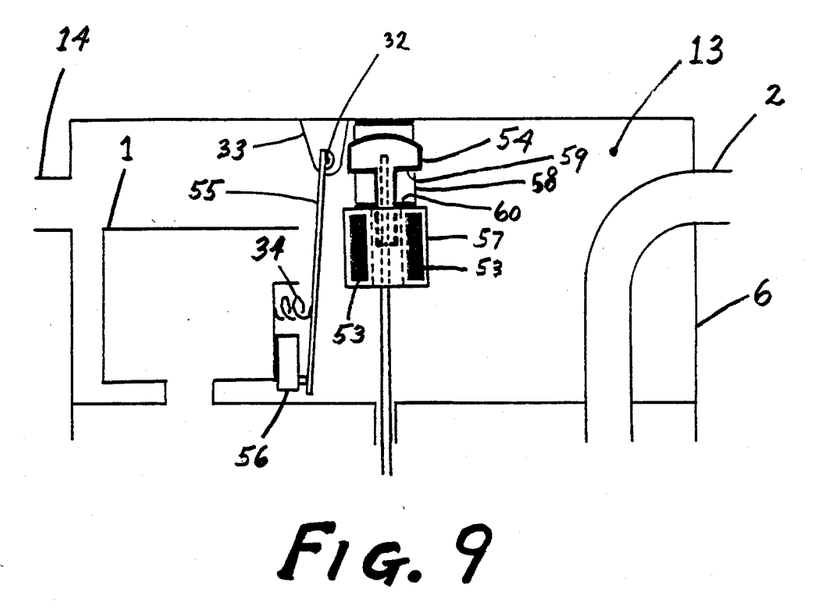
FIG. 9 shows the present invention with a solenoid but featuring electrical locking provided by a sail-actuated microswitch 56.

FIG. 9 shows that the mechanical interlock can be replaced by a combined mechanical-electrical interlock when a solenoid actuator is employed. The mechanical sail 55 no longer uses a mechanical catch, but now presses on the electrical interlock microswitch 56, which opens and prevents solenoid acuation when the blower is running enough to move the sail, even though blower electrical power may have been shut off, and the blower fan is coasting to a stop. Impact can be generated by the armature face 59 striking the coil structure face 60. The solenoid actuator 57 can be alternatively located at the bottom of the muffler chamber 13 in the position formerly occupied by the stop plate. If the coil structure is inadequate to withstand the impact, a stop plate and a plain shaft collar can be employed for impact generation.

NOTES ON TERMS

In this specification the terms "paper" and "paper-like" are intended to refer to filter papers and modern paper-like filter materials which can be formed into rigid pleats. The paper or material may be chemically treated or impregnated to control pore size, to add mechanical strength, or to improve the paper's resistance to fluids such as water which may be concurrently present with the particulate matter.

The term "shaft" is herein used for convenience to refer to the structural member which links the filter assembly to the cleaning actuator. It should be kept in mind that the shaft is transmitting only longitudinal motion and no rotary motion from the cleaning actuator to the filter assembly.

CLEANING OSCILLATIONS

In practicing this invention attention should be given to several important factors: (1) the sturdiness of the housing and its consequent ability to arrest the carefully oriented cleaning motion by impact at the stop plate; (2) The adequacy of the mass of the filter assembly including the filters and the mounting spider; and (3) the selection of the spring constant of the shaft connecting the filter assembly to the stop collar.

In the well-known theory of vibrations, the last two factors combine to act as a mechanical oscillator, which is excited during the filter cleaning process by a succession of step functions caused by the first factor, and which are damped out by complex structural and windage losses. The existence of this mechanical oscillation of the filter surfaces in their own planes is another reason for the particular efficaciousness of this invention. Therefore the shaft should not be of too large a cross section and consequently too rigid and stiff.

Experimentation is recommended. Filter assembly mass and connecting shaft spring constant should be varied to optimize oscillation amplitude and frequency obtained with a chosen housing structure and for a given dust and particulate combination.

SPECIAL PURPOSE APPLICATIONS

Because of the effectiveness of the method of cleaning filter surfaces by oscillating them in their own planes, it is believed that this arrangement is suitable for use in a low gravity environment, such as that of space. The vacuum collector should be oriented such that the shaft is in the weak gravity direction. The dust and particles knocked off from the filter surfaces will then slowly migrate to the bottom of the collector drum. Such a weak or even stronger artificial "local gravity" can also be generated by rotating a wheel type of space station at appropriate speeds. This creates a centrifugal force at the rim in the spoke direction. Thus the vacuum collector can be located at the rim with the shaft oriented like a spoke.

Although the invention was originally made and reduced to practice in the context of a portable shop-style and continuous-duty vacuum collector, it is believed that the basic arrangement also has more general applicability as a filtering component in the piping of special purpose systems.

I claim:

1. A high-suction portable, hybrid shop-style and continuous-duty vacuum collector, whose arrangement also has special purpose applicability, with improved capability and effectiveness in extending the running time between filter cleanings while filtering a wide range of sizes and weights of mixed dust and particulate debris from gases such as air and incorporating a compact, efficient and simple filter-cleaning mechanism that protects the operator and the environment from exposure to dust during cleaning but cannot accidentally be activated during the dirt collection process, comprising:

a detachable rigid air-tight dust-accumulating enclosure, open on top, into which the incoming particulate-laden gas flows from an inlet on entering in a direction to avoid striking any filter surfaces directly, and which collects the heavier particles by gravity on the bottom of said dust enclosure; and filter assembly means for producing a very large total filter surface area by mounting as an integral assembly, at least one gas-penetrable and dust-impervious hollow pleated filter, in which the normal directions to all of the filter surfaces are placed in a plane and are thus confined to two dimensions of three-dimensional space, and with this filter surface orientation no filter surface faces or has its normal in the third dimension, in order to collect the lighter particles and the dust on the outside of said oriented filter surfaces, and carried on a housing completely covering said open top of said dust enclosure so as to constitute a closed dust chamber containing said filter assembly, and which communicates with the clean gas region of said housing only through said filter; and filter cleaning means, further comprising:

filter moving means for constrained motion of said integral filter assembly as a unit only in said third dimension, and operated from outside said housing without having to disconnect any connections or subject said filter surfaces to any deformation; and filter shock means for subjecting said integral filter assembly as a unit to a sharp impact shock in said third dimension by abruptly arresting said motion in order to dislodge said particles and dust adhering to the outside of said filter surfaces, enabling them to fall by gravity to said bottom of said dust enclosure; and flexible filter connection means for maintaining the integrity of the internal gas passages from said filter assembly to the clean gas region of said housing while said motion and said shock are being applied, so that none of said particles and dust either enter said clean gas region or are dispersed to the external environment; and suction means for applying blower suction to said clean gas region and thence to the clean gas inside of said integral filter assembly through said flexible filter connection means; and an outlet from said housing for discharging into the surrounding atmosphere the filtered air from said suction means; and interlock means for rendering said filter cleaning means inoperable when said suction means is operating.

2. A vacuum collector according to claim 1 wherein said filter moving means comprises:

at least one strong shaft slidably mounted and constrained to have longitudinal motion in said third dimension and attached to said integral filter assembly and entering said dust chamber from said housing such that the filter surfaces move only in their surface planes and not normal to the surfaces; and actuating means for sliding said filter and shaft assembly to enable operation of the filter cleaning mechanism from a location external to the vacuum collector; and wherein said filter shock means comprises:

a strong metal stop plate fastened to said housing and with an impact face perpendicular to said shaft direction, and a strong metal stop collar securely fastened to said moving assembly and with an impact face parallel to, and capable of delivering a sharp blow to, the impact face of said stop plate while arresting the motion of said assembly, and such that the motion of said actuating means is transmitted to said filter assembly until the impact faces of said stop collar and said stop plate generate a sharp arresting shock which is transmitted to said filter assembly so as to knock off the dust accumulation by means of forces everywhere parallel to the filter surfaces but not normal to the filter surfaces so as not to deform said filter surfaces; and wherein said flexible filter connection means comprises:

flexible seals between the suction ends of said filter assembly and said clean gas region.

3. A vacuum collector according to claim 2 wherein said stop collar is attached to said shaft.

4. A vacuum collector according to claim 3 wherein said filter shock means further comprises a stiffly springable length of said shaft that separates said stop collar from said filter assembly so that said sharp arresting shock is transmitted through said springable length to the mass of said filter assembly to generate a mechanical oscillation in said third dimension to facilitate the cleaning of the filter surfaces.

5. A vacuum collector according to claim 4 wherein said third dimension for constraint of said longitudinal motion of said shaft is the local gravity direction, which is the vertical for the case of a stationary vacuum collector on the surface of the earth, and is the spoke direction for the case of a rotating wheel artificial gravity station in space.

6. A vacuum collector according to claim 5 wherein said filter shock means further comprises a spring mounted so as to normally keep the impact faces of said stop plate and said stop collar adequately separated against the force of local gravity such that the motion of said actuating means is transmitted to said filter assembly against the force of said spring.

7. A vacuum collector according to claim 6 wherein said interlock means comprises:
   a hinged sail springably placed in the path of the gas stream being delivered into a muffler chamber within said housing by said suction means, and wherein said muffler chamber has an outlet for the exiting clean gas; and
   locking means for preventing said actuating means from sliding said filter and shaft assembly when said sail is pivoted by the force of said gas stream such that said filter cleaning motion and shock cannot then be applied.

8. A vacuum collector according to claim 7 wherein said actuating means comprises at least one solenoid actuator capable of being energized electrically to move the solenoid armature which is connected to said moving assembly, and
   wherein said locking means comprises:
      a microswitch which is electrically closed only if the sail is resting and exerting no force against it in the suction off position, and is electrically open when said sail is pivoted by the force of said gas stream to prevent said solenoid actuator from being electrically energized.

9. A vacuum collector according to claim 7 wherein said locking means comprises:
   a catch on said hinged sail, and
   a locking shoulder on said moving assembly located so as to be engaged by the catch when said sail is pivoted by the force of said gas stream such that said filter cleaning motion and shock cannot then be applied.

10. A vacuum collector according to claim 9 wherein said actuating means comprises a strong actuating compound lever pivotally pinned to said stop collar, and also pivotally pinned at the compound end of the lever to a fulcrum bracket firmly attached to the housing structure, with a handle at the other or non-compound end of the lever and external to said housing for manual operation.

11. A vacuum collector according to claim 9 wherein said actuating means comprises a knob mounted on an external extension of said shaft.

12. A vacuum collector according to claim 9 wherein said actuating means comprises at least one solenoid actuator capable of being energized electrically to move the solenoid armature which is connected to said moving assembly.

13. A vacuum collector according to claim 9 wherein said actuating means comprises a strong actuating lever pivotally pinned to a loosely-fitted lever collar on said shaft to drive said stop collar, and also pivotally pinned at one end of the lever to a fulcrum bracket firmly attached to the housing structure, with a handle at the other end of the lever and external to said housing for manual operation.

14. A vacuum collector according to claim 13 wherein said actuating means further comprises a sturdy thrust-slip washer placed loosely on said shaft between said lever collar and said stop collar.

15. A vacuum collector according to claim 13 or 14 or 10 or 11 or 12 or 8 wherein said filter assembly means comprises:
   a plurality of cylindrical pleated-paper-like filters with filter mounting means on one closed circular end with an opening for the suction on the other circular end, and
   a strong symmetrical spider with a number of arms equal to the number of said filters and arranged to receive said filter mounting means on the end of each arm, and with spider mounting means provided at the center of the spider for attaching said filter assembly to said shaft.

16. A vacuum collector according to claim 15 wherein said flexible seals between the suction end of said filter assembly and said clean gas region are conical in shape and sloping in the local gravity direction so as to allow the accumulated dirt to slide away during the filter cleaning process.

17. A vacuum collector according to claim 13 or 14 or 10 or 11 or 12 or 8 wherein said filter assembly means comprises a single cylindrical pleated-paper-like filter with mounting means for direct attachment to said shaft.

18. A vacuum collector according to claim 17 wherein said flexible seals between the suction end of said filter assembly and said clean gas region are conical in shape and sloping in the local gravity direction so as to allow the accumulated dirt to slide away during the filter cleaning process.

* * * * *